Aug. 11, 1959 M. B. GREGORY 2,899,648
TRANSISTOR OSCILLATOR FOR VIBRATO PURPOSES
Filed Dec. 20, 1956
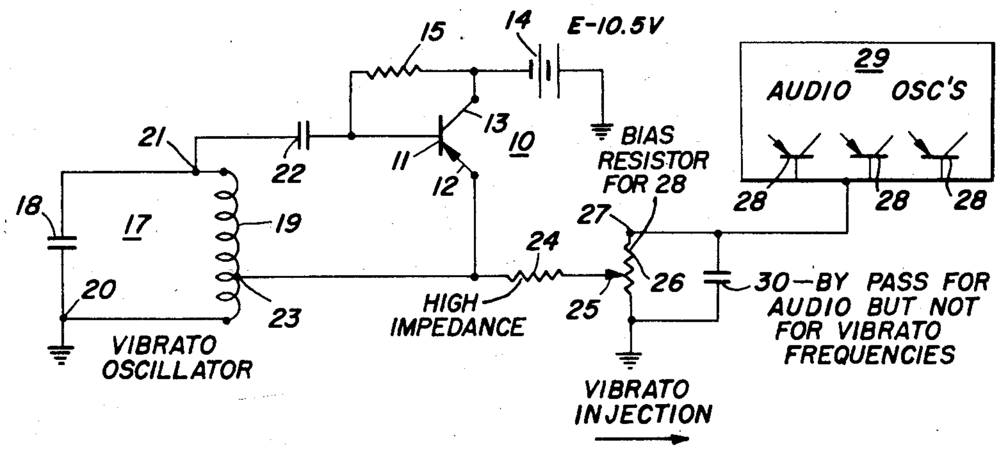
INVENTOR
Marion B. Gregory
BY [signature]
AGENT United States Patent Office 2,899,648

Patented Aug. 11, 1959

2,899,648

TRANSISTOR OSCILLATOR FOR VIBRATO PURPOSES

Marion B. Gregory, Cincinnati, Ohio, assignor to The Baldwin Piano Company, Cincinnati, Ohio, a corporation of Ohio Application December 20, 1956, Serial No. 629,609

10 Claims. (Cl. 331—117)

The present invention relates generally to transistor oscillators and frequency modulating systems, and more particularly to transistor oscillators adapted for generating vibrato signals for electrical musical instruments and to modulating systems capable of advantageously employing the oscillators.

Vibrato oscillators are required to generate a low frequency signal and to supply that signal to an output load which itself is constituted of one or more audio frequency oscillators, to frequency modulate the latter. The vibrato oscillator must be capable of supplying a signal of controllable amplitude, and should not be affected in frequency or amplitude by the audio signals that are modulated, nor by the shunting effect of the output load. Further, variation in vibrato signal amplitude must not effect detuning of the modulated oscillators, nor reflect as a variation in vibrato signal frequency. The requirements which must be met by a vibrato oscillator in electronic musical instruments are therefore particularly stringent.

Briefly describing a preferred embodiment of the present invention, a transistorized Hartley sub-audio oscillator circuit is employed to generate the vibrato signal, the load of the oscillator including a relatively low resistance fed from the emitter electrode of the transistor, through a relatively high resistance, at a variable tap on the resistor. The oscillator system is taken to include the relatively high resistance, and as seen by the load resistance is a constant current source. Consequently, the setting of the variable tap determines output voltage across the load resistance. A capacitor having negligible reactance at audio frequencies is shunted across the output resistor, to prevent mixing of the audio frequencies at the control point. The audio oscillators are transistor oscillators employing the common base configuration, and the load resistance provides a low impedance D.C. path to a point of reference potential for their base circuits. The output resistance and shunting capacity thereby provide isolation between the vibrato oscillator and the audio oscillators, which see the vibrato system as a negligible A.C. impedance in shunt with a fixed D.C. resistance.

One conventional type of electronic musical instrument includes twelve master oscillators, from the outputs of which are derived directly and by frequency division all the required basic tones of the organ. Frequency modulation of the twelve master oscillators thus effects frequency modulation of all the tones of the instrument. In conventional circuits the twelve master oscillators act as twelve current generators feeding the single output load of the vibrato system, the latter including resistance. Therefore, if the resistance is changed while the current through the resistance is not changed compensatively the D.C. level at the resistance will be changed. This change in D.C. level will cause the twelve master oscillators to change their average frequency, and is therefore highly undesirable. In accordance with the present invention the resistance is by-passed for audio frequencies by a condenser which provides a low impedance path for audio frequencies, but not for the much lower vibrato frequencies, while the resistance provides a fixed D.C. path for the base circuits of the audio oscillators. Variation of vibrato signal amplitude is accomplished by varying the tap on the resistance, which does not affect the impedance seen by the master oscillators, nor vary the frequency of the vibrato oscillator. To accomplish the last stated result, the emitter electrode of the vibrato oscillator is arranged to remain essentially at reference potential for D.C. under all operating conditions, while A.C. variation is permitted.

It is accordingly, a broad object of the present invention to provide a novel transistor oscillator.

It is a further object of the invention to provide a system of frequency modulation of a transistorized audio oscillator by the output of a transistorized sub-audio oscillator, without interaction between the oscillators in response to variation of amplitude of the output of either oscillator.

It is still another object of the present invention to provide a novel transistor sub-audio oscillator system having a resistive load, the system appearing at the load as a constant current source.

Still another object of the invention resides in the provision of a transistorized frequency modulation system, in which a plurality of transistor audio oscillators are provided with a common base circuit, the base circuit including a capacitive path of negligible impedance for audio frequencies to a reference point, and a shunting low D.C. resistive path, the latter being supplied at a variable point thereof with sub-audible modulating signals from a constant current source.

It is still a further object of the present invention to provide a novel transistor oscillator having a resistive output circuit connected between the emitter electrode of the transistor and a point of reference potential.

A further object of the present invention resides in the provision of a transistor oscillator employing a single D.C. source of power, and minimum number of circuit components.

The above and still further objects, features and advantages of the present invention will become apparent upon consideration of the following detailed description of one specific embodiment thereof, especially when taken in conjunction with the accompanying drawings, wherein:

The single figure is a schematic circuit diagram of a system according to the present invention.

Referring now more particularly to the accompanying drawings, the reference numeral 10 denotes a PNP junction transistor having a base electrode 11, an emitter electrode 12 and a collector electrode 13. A source of negative voltage 14 of negligible impedance is connected between the collector electrode 13 and a point of reference potential, indicated as ground. A relatively large resistance 15 is connected between the collector electrode 13 and the base electrode 11, to develop a suitable operating potential for the base electrode 11, and the emitter electrode 12 is connected through a resistive path to the point of reference potential.

A parallel resonant tank circuit 17, including a condenser 18 and an inductance 19, is provided. One terminal 20, of the tank circuit 17, is connected directly to the point of reference potential, and the remaining terminal 21 is connected via a D.C. isolating condenser 22 to the base electrode 11. The emitter electrode 12 is connected to a suitable tap point 23 of the inductance 19. The circuit is of the Hartley type, and may be designed to oscillate at approximately 6.9 c.p.s., when intended for use as a vibrato signal generator in an electronic musical instrument.

For the sake of example only, and not by way of limitation, a transistor type 2N76 may be employed, and the supply voltage may be 10.5 v., and the resistance 15 270K.

A resistance 24 may be connected between the emitter electrode 12 and a variable tap 25 on a load resistance 26 (200-ohms). One end of the latter may be connected to the aforementioned point of reference potential, and the remaining end 27 employed as an output terminal for connection to the base electrodes 28 of a plurality of master audio oscillators 29. The latter each generate notes of a different nomenclature within an octaval range of an electronic musical instrument, such as an electronic organ, and constitute a set of master audio oscillators for the instrument. Signals for generating additional octavely related notes are derived by frequency division from the master oscillators, a technique which is presently conventional in the art of electronic musical instruments.

The resistance 26 is shunted by a condenser 30, which has a low reactance at any frequency supplied by the set of master audio oscillators 29.

Accordingly, the set of master audio oscillators sees a negligible A.C. load, equal to the reactance of condenser 30, but is provided with a low resistance path to the point of reference potential. The voltage of the base electrode 38 may be considered equal to reference potential for audio frequencies, and substantially no audio voltage is developed across resistance 26, nor applied to the vibrato oscillator nor any component thereof. The output level of the audio oscillators does not, therefore, affect the operation of the vibrato oscillator in respect to either output level or frequency.

Variation of the position of the tap 25 along resistance 26 varies the level of vibrato signal which is supplied to the base electrode 28, since the modulator system comprising transistor 10, as seen from the tap 25, is a constant current source. The utilization of a variable tap 25 for insertion of vibrato signal current from a constant current source into a variable point of a fixed resistance assures that the D.C. level of the base electrodes 28 will remain constant for all positions of the tap 25, the resistance 24 providing, in this respect, isolation between resistance 26 and the inductance 23. This effect occurs because for any position of tap 25 the resistance in shunt with the tapped portion of resistance 26 is quite high relative to the resistance from the tap 25 to ground.

The emitter electrode 12 is essentially at reference potential for D.C. since the resistance of inductance 17 is quite small, but the A.C. voltage developed between terminal 23 and reference potential is applied by resistance 24 and the portion of resistance 26 subsisting between tap 25 and the reference point, and two latter resistances acting as a voltage divider, and the A.C. voltage at the tap 25 is that seen by the base electrodes 28. Accordingly, since resistance 24 may have a value of 10K and resistance 26, a value of 200 ohms, for example, the tank circuit 17 sees an essentially constant load for all positions of tap 25, and the vibrato oscillator is not affected by variation of tap 25.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. An oscillator comprising a semi-conductor amplifier having a base electrode, an emitter electrode and a collector electrode, a tank circuit comprising a condenser and a coil connected in parallel, said coil including two end terminals and an intermediate terminal, one of said end terminals being connected to said base electrode, the other of said end terminals being connected to a point of reference potential, said emitter electrode being connected directly to said intermediate terminal of said coil, a relatively low resistance output circuit for said oscillator, a relatively high resistance connected directly between said emitter electrode and said low resistance output circuit, whereby said output circuit sees said oscillator as a constant current source and means for varying the resistance of said low resistance output circuit.

2. The combination according to claim 1, wherein is provided a single direct current voltage source, means connecting said single direct current voltage source between said point of reference potential and said collector electrode, and a base electrode bias resistance connected directly between said collector electrode, and said base electrode.

3. The combination according to claim 2, wherein said resistance output circuit includes one terminal connected to said point of reference potential and a further terminal, a variable tap on said resistance load circuit, and a connection from said variable tap through said relatively high resistance to said emitter electrode.

4. The combination according to claim 3 wherein is further provided a by-pass condenser for relatively high frequency connected across said resistance load circuit, said oscillator being arranged and adapted to generate a relatively low frequency, at least one source of said relatively high frequency connected in series with said resistance load circuit.

5. The combination according to claim 4 wherein said at least one source of said relatively high frequency includes a transistor oscillator having a base electrode connected to said further end terminal.

6. A frequency modulation system comprising a relatively high frequency oscillator, the frequency of which is to be modulated, said relatively high frequency oscillator being a transistor oscillator including a base electrode, the potential of said base electrode with respect to a reference potential being a factor in determining the frequency of said oscillator, a fixed relatively low resistance connected between said base electrode and said point of reference potential, a capacitive by-pass circuit for said relatively high frequency connected in shunt to said relatively low resistance, a variable tap on said relatively low resistance, and means for supplying relatively low frequency modulating signal from a constant current source to said variable tap.

7. A sub-audio sinusoidal oscillator comprising a semiconductor device having a base electrode, an emitter electrode and a collector electrode, a tank circuit having a condenser and a low resistance coil connected in parallel, said coil having a first end tap, a second end tap and an intermediate tap, a blocking capacitor connected between said first said tap and said base, a direct current connection between said intermediate tap and said emitter electrode, said second end tap being connected to a point of reference potential, whereby said intermediate tap is substantially at said reference potential for direct current, a source of direct current supply voltage connected between said collector electrode and said point of reference potential, a bias resistance connected between said collector electrode and said base electrode, and a relatively high resistance connected between said emitter electrode and an output terminal, whereby said output terminal presents said oscillator as a constant current alternating current source.

8. In a modulating system, a constant current source of modulating signal comprising an oscillator, a relatively low resistance load for said oscillator, said load including a resistance having a variable tap, said constant current source being connected between said tap and one end of said resistance, a source of relatively high frequency subject to frequency modulation in response to variation of voltage applied thereto, and means for applying the voltage existent across said resistance to said source of relatively high frequency for modulating the frequency thereof, and a by-pass condenser for said relatively high frequency connected across said resistance.

9. An oscillator comprising a semi-conductor amplifier having at least a base electrode, an emitter electrode and a collector electrode, a tank circuit comprising at least a condenser and a coil connected in parallel, means connecting said tank circuit between two of said electrodes, said tank circuit including two end terminals and an intermediate terminal, one of said end terminals being connected to a point of reference potential, one of said transistor electrodes being connected directly to said intermediate terminal, a relatively low resistance output circuit for said oscillator, and a relatively high resistance connected directly between said one of said transistor electrodes and said low resistance output circuit, whereby said output circuit sees said oscillator as a constant current source.

10. The combination according to claim 9 wherein is further provided a by-pass condenser for relatively high frequency connected across said relatively low resistance output circuit, said oscillator being arranged and adapted to generate a relatively low frequency, and at least one source of said relatively high frequency connected in series with said low resistance output circuit.

References Cited in the file of this patent

FOREIGN PATENTS 760,749 Great Britain ---------- May 20, 1954